(12) United States Patent
Lee

(10) Patent No.: US 6,504,282 B2
(45) Date of Patent: Jan. 7, 2003

(54) ARMATURE CORE OF START MOTOR

(75) Inventor: Won-Jeong Lee, Kyongsangbuk-do (KR)

(73) Assignee: Valeo Mando Electrical Systems Korea Limited, Kyoungsanbuk-do (KR)

(*) Notice: Subject to any disclaimer, the term of this patent is extended or adjusted under 35 U.S.C. 154(b) by 0 days.

(21) Appl. No.: 09/843,367

(22) Filed: Apr. 25, 2001

(65) Prior Publication Data

US 2001/0045789 A1 Nov. 29, 2001

(30) Foreign Application Priority Data

Apr. 27, 2000 (KR) .............................. 00-22509

(51) Int. Cl.[7] .............................. H02K 1/00; H02K 3/34; H02K 1/12
(52) U.S. Cl. .................. 310/216; 310/215; 310/254; 310/214
(58) Field of Search .................. 310/216, 45, 215, 310/214, 264, 265, 259, 254

(56) References Cited

U.S. PATENT DOCUMENTS

| | | | | |
|---|---|---|---|---|
| 3,760,493 A | * | 9/1973 | Snively | 29/596 |
| 3,909,648 A | * | 9/1975 | Clark | 310/260 |
| 4,400,639 A | * | 8/1983 | Kobayashi et al. | 310/215 |
| 4,876,473 A | * | 10/1989 | Tanaka et al. | 310/216 |
| 6,242,836 B1 | * | 6/2001 | Ishida et al. | 310/215 |

* cited by examiner

Primary Examiner—Thanh Lam
(74) Attorney, Agent, or Firm—R. Neil Sudol; Henry Coleman; William Sapone

(57) ABSTRACT

The present invention relates to an armature core of a start motor in which in which the depth of a slop in which an insulation member installed in a core is overlapped is deeper than other insulation members by 1.5 through 2.5 times compared to the thickness of an insulation member, and the width of the slot is the same as that of the other slots. There is provided an armature core of a start motor in which a width "a" of the insulation overlapping slot and a width "b" of other slot are same, and a depth "A" of the overlapping slot is 1.5 through 2.5 times of a thickness of the insulation member compared to a depth "B" of the slot, and a groove is formed at an entrance portion of the slot in a structure that a front end and rear end of an insulation member are overlapped and inserted in an armature core of a start motor, and one insulation member overlapping slot and a plurality of slots each having a certain width and depth are radially formed.

3 Claims, 3 Drawing Sheets

10

ARMATURE CORE OF START MOTOR

BACKGROUND OF THE INVENTION

1. Field of the Invention

The present invention relates to an armature core of a start motor, and in particular to an armature core of a start motor in which the depth of a slot in which an insulation member installed in a core is overlapped is deeper than other insulation members by 1.5 through 2.5 times compared to the thickness of an insulation member, and the width of the slot is the same as that of the other slots.

2. Description of the Background Art

Generally, in order to rotate a pinion, an armature is installed in a start engine which is capable of starting an engine of a vehicle. The armature is formed of a plurality of cores overlapped. The slots on which a coil is wound are radially formed in the core.

As shown in FIG. 1, a conventional core 1 of a start-motor armature 10 (FIG. 3) is formed of one insulation member overlapping slot 3, in which a front end 5a and a rear end 5b of the insulation member 5 are overlapped, and a slot 2 having a certain width and depth. The insulation member overlapping slot 3 has a width wider than the thickness t of the insulation member 5 compared to the other slots 2.

Namely, the above slots are formed in such a manner that the width "a" of the overlapping slot 3 is smaller than the width "b" of the other slot 2 (a>b). A coil is wound onto the slot. The slots are installed so that the overlapping portion of the insulation member is not escaped by the coil.

However, in the conventional art, the width of one overlapping slot is wider than the width of the other slot for an overlapping portion of the insulation member. Therefore, the widths of both sides of the slot having a wider slot becomes narrow. As the width is decreased, the strength of the portion in which the width is decreased is weak compared to the other portions. Therefore, when winding the coil onto the slot, the portion in which the width is decreased may be transformed. The winding state of the coil is bad. The performance of the start motor is decreased.

SUMMARY OF THE INVENTION

Accordingly, it is an object of the present invention to provide an armature core of a start motor in which the depth of a singular slot in which an insulation member installed in a core is overlapped is deeper than the depth of other slots by 1.5 through 2.5 times the thickness of the insulation member, and the width of the singular slot is the same as that of the other slots.

In order to achieve the above object, there is provided an armature core of a start motor in which a width "a" of the insulation overlapping slot and a width "b" of other slot are same, and a depth "A" of the overlapping slot is 1.5 through 2.5 times of a thickness of the insulation member compared to a depth "B" of the slot, and a groove is formed at an entrance portion of the slot in a structure that a front end and rear end of an insulation member are overlapped and inserted in an armature core of a start motor, and one insulation member overlapping slot and a plurality of slots each having a certain width and depth are radially formed.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
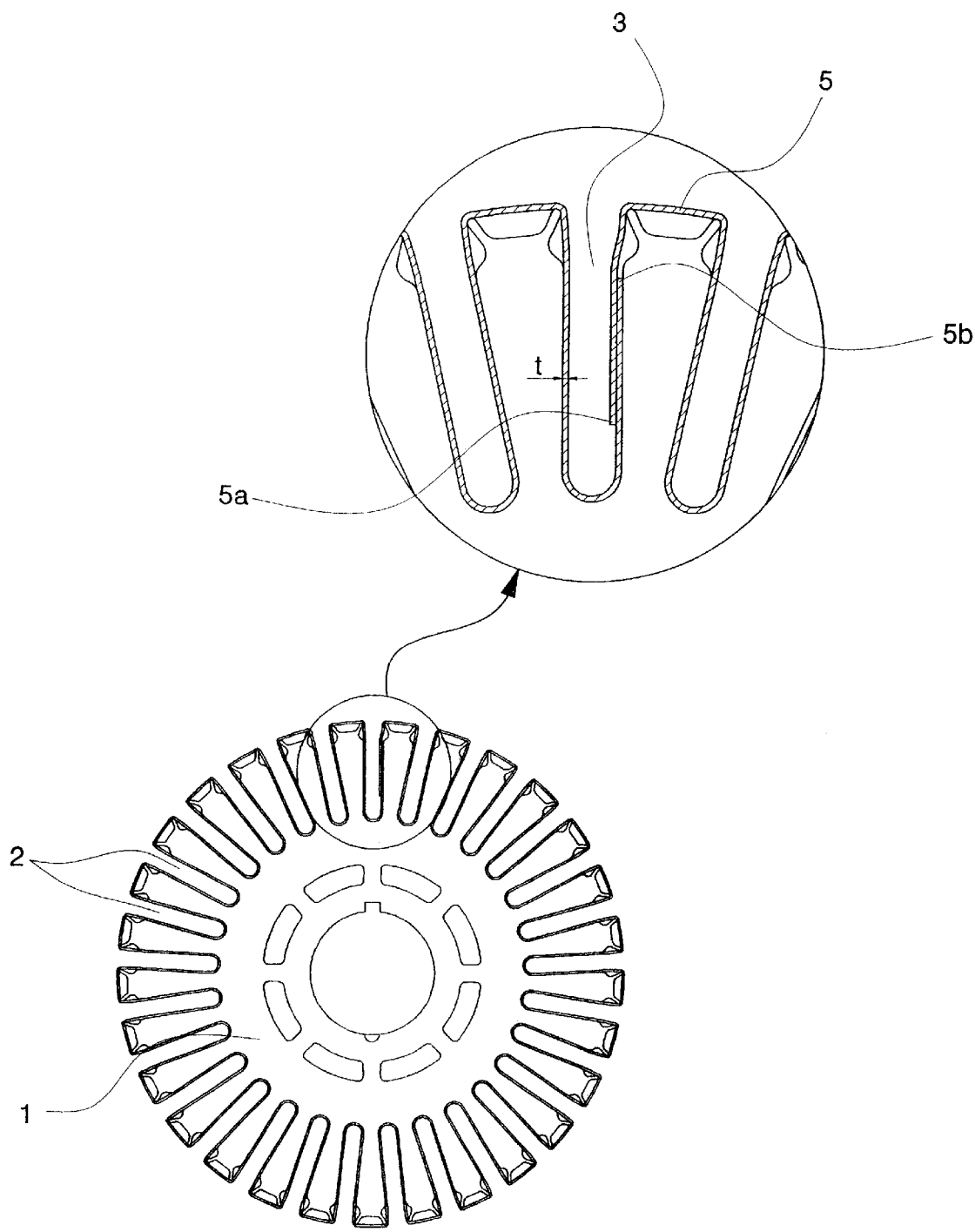
FIG. 1 is a view illustrating a conventional core structure.
Figure 2:
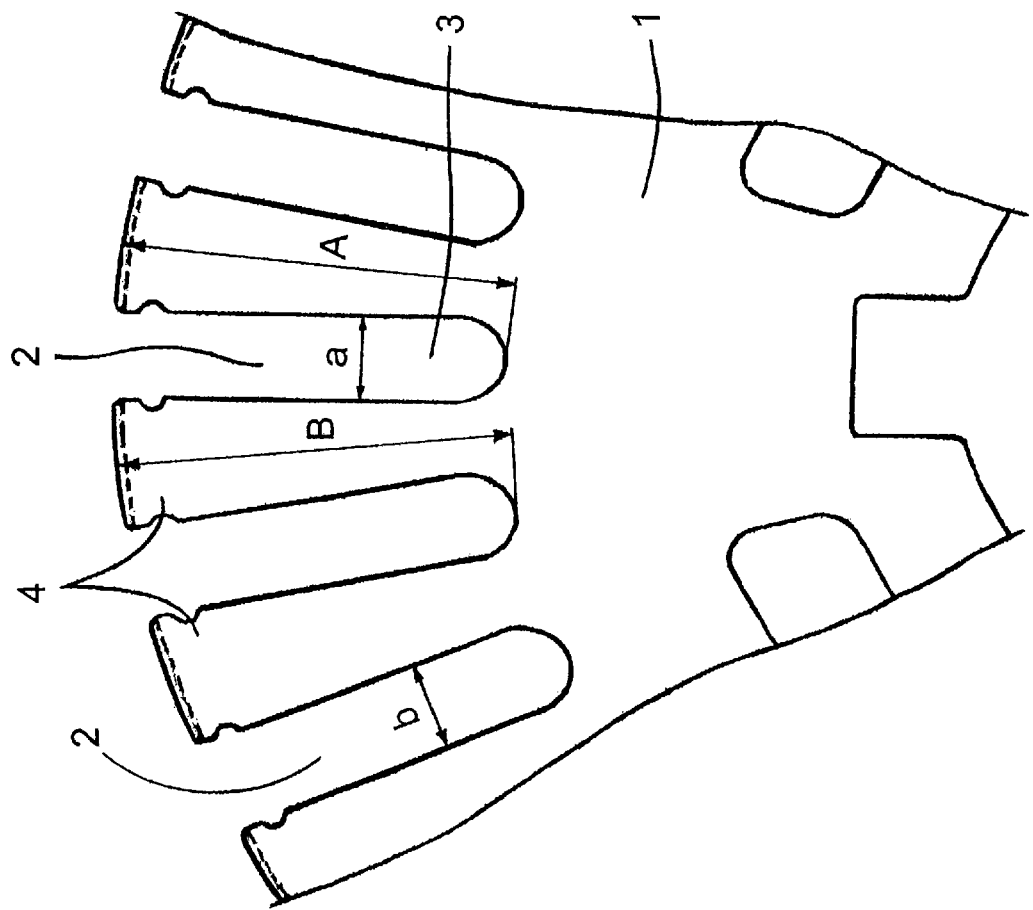
FIG. 2 is a view illustrating a core structure according to the present invention.
Figure 3:
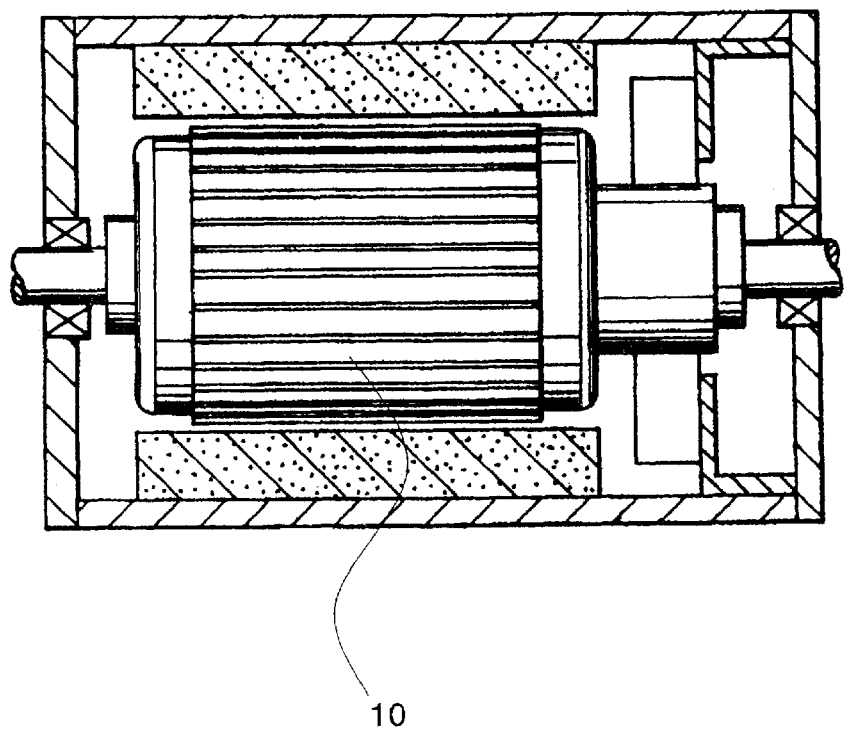
FIG. 3 is a view illustrating a start motor with a conventional armature.

The embodiments of the present invention will be explained with reference to the accompanying drawings.

In a structure that a front end and rear end of an insulation member are overlapped and inserted in an armature core I of a start motor, and one insulation member overlapping slot 3 and a plurality of slots 2 each having a certain width and depth are radially formed, an armature core of a start motor in which a width "a" of the insulation overlapping slot 3 and a width "b" of other slot are same, and a depth "A" of the overlapping slot 3 is 1.5 through 2.5 times of a thickness of the insulation member compared to a depth "B" of the slot 2, and a groove 4 is formed at an entrance portion of the slots.

In a state that a front end and rear end of an insulation member are overlapped at an end portion of the depth "A" of an insulation overlapping slot 3 formed in an armature core 1 of a start motor, when winding a coil onto the overlapping slot 3 and each slot 2, the overlapping portion of the insulation member is not formed at a side portion of the slot 3, but formed on a depth portion. Since the depth is 1.5 through 2.5 times compared to the thickness of the insulation member, it is easy to insert the insulation member into the slot. Therefore, it is possible to prevent an escape of the insulation member. Even when the width "a" of the overlapping slot 3 of the insulation member and the width "b" of the other slot 2 are same, the finishing process of the insulation member is stably implemented. In addition, since the widths of both support portions of the overlapping slot 3 are the same as the widths of the support portions of the other slots 2, the core is not transformed when winding the coil. In a state that the coil is wound onto the slot, the upper entrance portions of the slots 2 and 3 are cut along a groove 4, and then the outer size of the core is determined. Therefore, the winding procedure of the core is effectively implemented. The installation state of the insulation member is stable.

As described above, the width of the overlapping slot 3 is the same as the slot 2, and the depth of the overlapping slot 3 is as deeper as the thickness of the insulation member. Therefore, the core balance is implemented based on the slot formation of the core. It is possible to prevent transformation of the core. When winding the coil, the overlapping portion of the insulation member is stably finished. The installation state of the insulation member is good, and the finishing procedure of the insulation member is easily implemented. It is possible to prevent any damage and transformation of the core. Since the winding coil is stably supported by a groove 4, it is possible to enhance the performance of the start motor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an armature core of a start motor having a structure that a front end and a rear end of an insulation member are overlapped and inserted in the armature core, one insulation member overlapping slot and a plurality of slots each having a certain width and depth are radially formed, and a groove is formed at an entrance portion of the slots, the improvement wherein:

(a) a width "a" of the insulation overlapping slot and a width "b" of other slots are the same, and
   (b) a depth "A" of the overlapping slot is greater that a depth "B" of the other slots by 1.5 through 2.5 times a thickness of the insulation member.

2. An starter-motor armature core having a plurality of radially oriented first slots having a common width and a common depth, said armature core also having one radially oriented second slot for receiving a front end and a rear end of an insulation member so that said front end and said rear end are overlapped with one another in said second slot, a groove being formed at entrance portions of said first slots and said second slot, said second slot having said common width, said second slot having a depth which is deeper than said common depth by an amount sufficient to accommodate the overlapped front end and rear end of the insulation member.

3. The armature core according to claim 2 wherein said amount is equal to about 1.5 through about 2.5 times a thickness of the insulation member.

* * * * *